Jan. 22, 1924.
H. F. RIESKE
WHEEL
Filed April 4, 1921
1,481,484
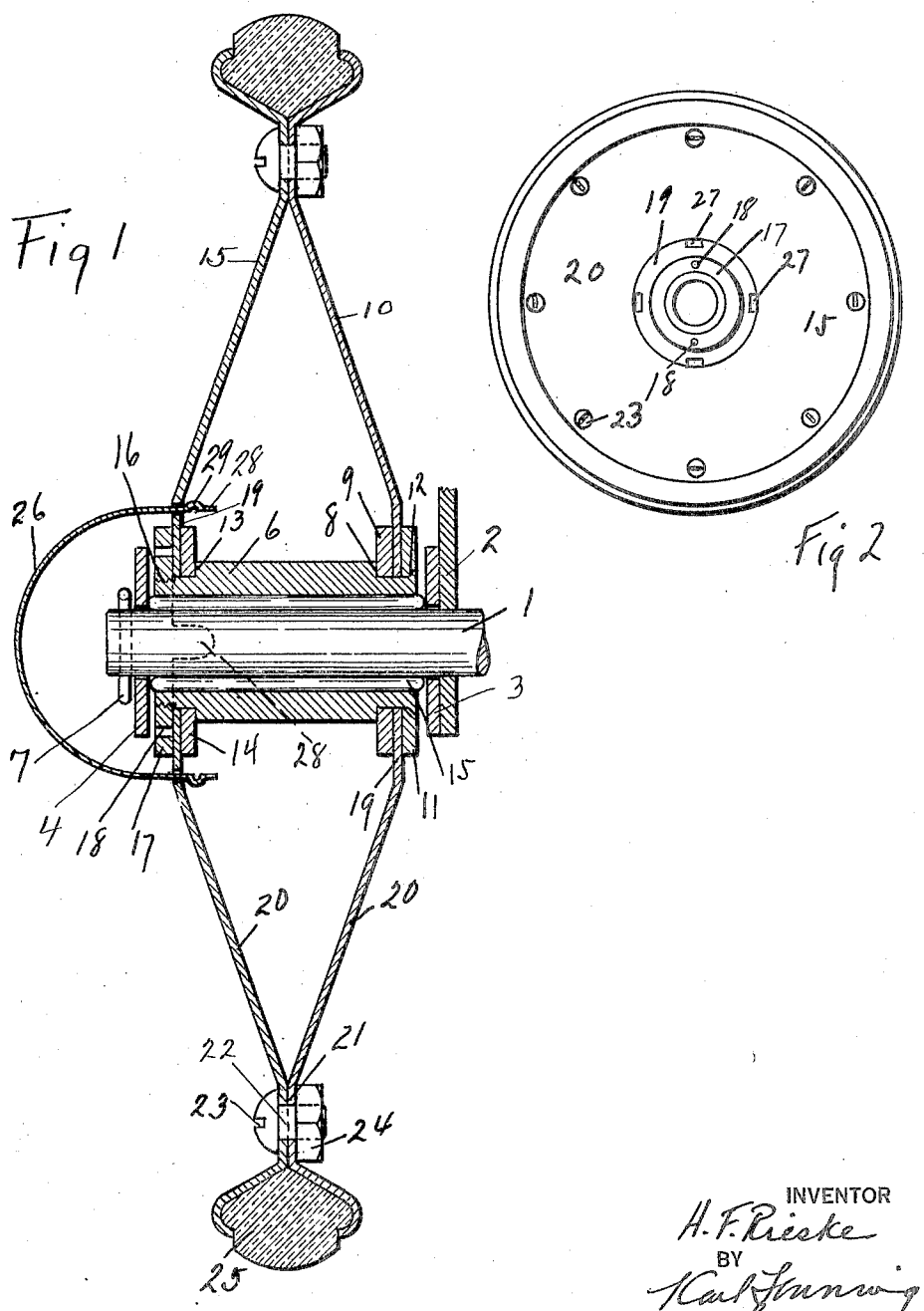
INVENTOR
H. F. Rieske
BY
his ATTORNEY Patented Jan. 22, 1924.

1,481,484

UNITED STATES PATENT OFFICE.

HENRY F. RIESKE, OF LAKEWOOD, OHIO.

WHEEL.

Application filed April 4, 1921. Serial No. 458,365.

*To all whom it may concern:*

Be it known that I, HENRY F. RIESKE, a citizen of the United States, and a resident of Lakewood, in the State of Ohio, have invented certain new and useful Improvements in Wheels, of which the following is a specification.

My invention relates particularly to so called disc wheels which are especially adapted to be employed in connection with children's toy wagons but in some aspects the invention is not confined thereto.

A purpose of the invention is to make a wheel which is efficient, durable and sturdy and at the same time is pleasing in appearance and relatively simple and cheap to manufacture.

In order to fully disclose the invention the accompanying drawings show one embodiment of the invention in a specific form of wheel. The details shown are not essential to the invention and are shown for the purpose of illustration only and not to limit the scope of the claim.

Figure 1 is a transverse vertical section of a wheel mounted on an axle. Fig. 2 is a side elevation of an unmounted wheel on a somewhat reduced scale.

One end of an axle 1 may pass through a portion of the bolster 2 or other support for the wagon body. Adjacent the bolster 2 on the axle is a loose washer 3 between which and a second loose washer 4 also upon the axle 1 are roller bearings 5 supporting the hub 6 of the wheel. A cotter pin 7 passing through a hole in the end of the axle 1 holds the washer 4 on the axle. Any other suitable and well known means may be provided for the wheel mounting.

The wheel shown consists of a cylindrical hub 6 one end (the right hand end in Fig. 1) of which may be reduced in section to produce a shoulder 8. A washer 9 may be forced upon the reduced end of the hub 6 to fit snugly against the shoulder 8. A disc 10 may be then forced upon the reduced end of the hub to fit snugly against the washer 9 and a washer 11 finally forced upon the reduced end of the hub 6 to engage the disc 10. The washers and disc may be held in place by friction. On its outer surface the washer 11 may be chamfered or cut out around the central hole at 12 so that, as the washer is forced on, the reduced end of the hub 6 may be slightly upset into the chamfered recess to securely and more or less permanently hold the disc 10 in place.

At the other end (the left hand end in Fig. 1) of the hub 6 is shown a reduced portion forming a shoulder 13 against which may be forced a washer 14 on the reduced portion of the hub 6. A second disc 15 may be forced onto this reduced end of the hub 6 to fit snugly against the washer 14. Screw threads 16 are shown on the end of the reduced portion of the hub 6 to receive a washer 17 which may be screwed tightly against the disc 15. The washer 17 acts as a nut so may be irregular in shape or may be provided with any suitable means to aid in turning it. To this end are shown holes 18 which may be engaged by a suitable turning tool as is well known.

The arrangement shown is preferred and has advantages but it is obvious that both ends of the hub might be treated alike using either the arrangement shown at the left of Fig. 1 or the arrangement shown at the right. Preferably the discs 10 and 15 are held against rotation about the hub 6.

The discs 10 and 15 are similar in that each has a flat portion 19 extending between the washers surrounding which is a frusto-conical portion 20 so positioned that the two discs meet each other in a flat annular seat 21 preferably about centrally overlying the hub 6. The annular seats 21 are perforated and through them extend bolts 22 of any suitable form to clamp the two discs together and hold them from slipping or turning. The bolts 22 are shown provided with slotted heads 23 and engaging nuts 24. Beyond the seats 21 the discs 10 and 15 expand to form a suitable annular seat for a tire 25. The nuts 24 may be arranged to abut closely against the seat of the tire 25 so that the nuts may be held from turning and the device assembled by using a screw driver in the slotted heads 23 of the bolts 22 to firmly fasten together the discs 10 and 15 in such a way as to hold the tire 25 in its seat.

A hub cap 26 is illustrated as substantially hemispherical in shape although this exact form is not essential. Slots 27, of which four are shown in the present instance, may be provided in the discs. These slots are preferably at about the point where the flat portions 19 meet the frusto-conical portions 20 of the discs but they may be omitted entirely from the disc mounted on the end of the hub toward the wagon body. Tongues 28 provided with locking curves or projections 29 may be arranged around the circumference of the edge of the hub cap 26 in position to correspond with the location of the slots 27 in the disc adjacent the end of the axle. If the whole hub cap 26 or the lugs 28 or the projections 29 are resilient the hub cap may be forced in place by inserting the tongues 28 into the slots 27 and then pushing. When once forced to their seats the irregularities 29 will hold the hub cap 26 more or less snugly in place over the washer 17 and the end of the axle until removed by tension or the stress of some tool inserted under it. The hub cap conceales the fastening mechanism at the end of the axle and at the same time tends to exclude dirt and foreign matter while it thus receives and saves from being lost the cotter pin 7 and the washer 4 if they become dislodged.

I claim as my invention:

In a device of the character described, a tubular hub having sections of smaller diameter at each end thereof providing annular shoulders, a pair of discs of sheet material centrally apertured to fit over the respective ends of said hub, said discs having flat central and peripheral sections and frusto-conical intermediate sections, washers fitted over the respective reduced hub sections, the centrally flattened portion of said discs seated against their respective washers, an outside washer, having a cut out portion extending radially from its central aperture, seated against the outer face of one of said discs and held in rigid relation thereto by the upsetting of the adjacent end of the hub into said radial cut out portion, and a screw threaded washer in threaded engagement with the other end of said hub and adapted to be turned into clamping engagement against the central portion of the disc positioned on the outside of said hub, the circumferential portions of said discs being inclined toward each other to provide a V-shaped seat for a rubber tire, and means for holding the flat peripheral portions of said discs firmly together and at the same time serving to firmly clamp a rubber tire within said seat.

HENRY F. RIESKE.